Jan. 18, 1949.  C. F. MESSINA ET AL  2,459,712
RESTRAINING DEVICE
Filed Aug. 2, 1946  2 Sheets-Sheet 2
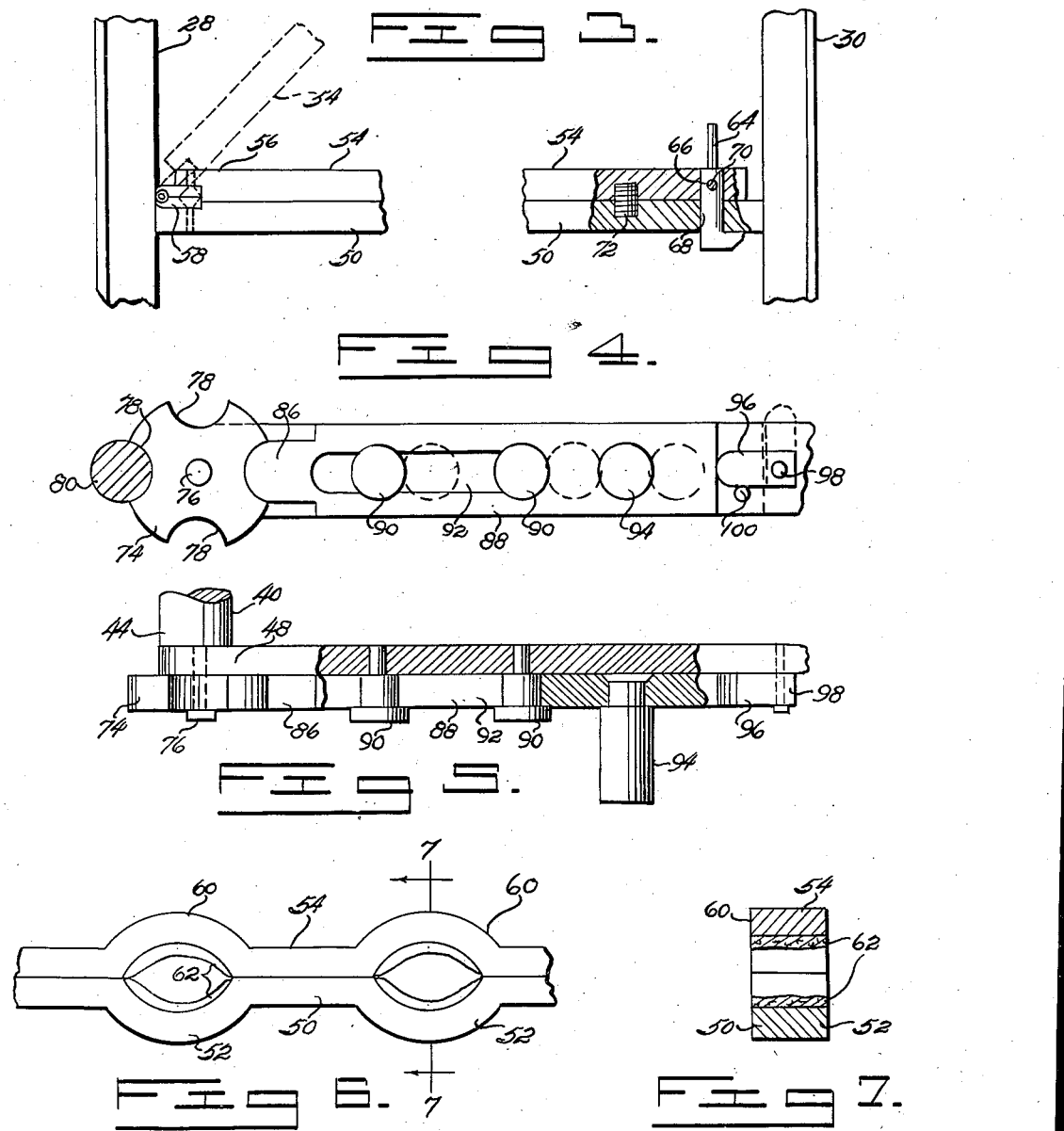
INVENTORS
CHARLES F. MESSINA
MICHAEL M. MESSINA
BY
ATTORNEYS Patented Jan. 18, 1949

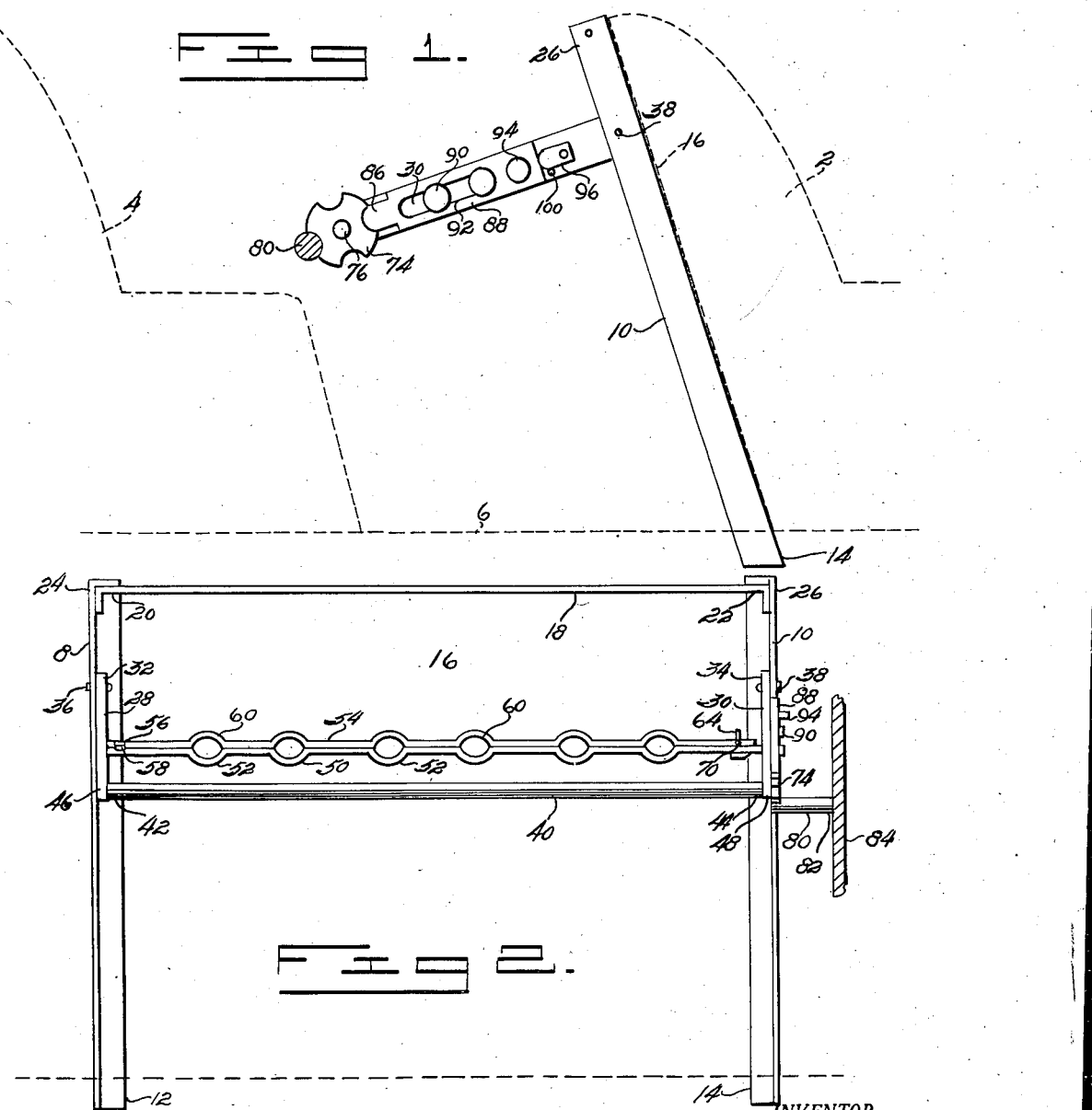

2,459,712

UNITED STATES PATENT OFFICE 2,459,712

RESTRAINING DEVICE

Charles F. Messina and Michael M. Messina, Central Valley, N. Y.

Application August 2, 1946, Serial No. 688,012

6 Claims. (Cl. 70—16)

This invention relates to equipment to aid police officers in transportation of prisoners.

An object of the invention is to provide a device which, when installed in a police automobile or the like, will handcuff prisoners and restrain them from escaping.

Another object of the invention is to provide a police accessory which will enable a single policeman to transport a prisoner in the back seat of a police automobile and will hold the prisoner securely against injuring the policeman during the trip.

A further object of the invention is to provide a handcuff device which may be installed in police automobiles without substantial structural changes therein.

Still another object of the invention is to provide a restraining device for preventing the escape of prisoners, which is simple in design, inexpensive to manufacture, and effective in operation.

Other objects and advantages of the invention will become apparent from the following description of a preferred embodiment thereof as illustrated in the accompanying drawings, and in which, Figure 1 is a side elevation of the device as installed in a police automobile, Figure 2 is an elevational view of the device as seen from the left of Figure 1, Figure 3 is a fragmentary view of a portion of the device illustrating the mode of attachment of the left and right ends of the handcuff bars as seen in Figure 2, Figure 4 is an enlarged side elevation of a portion of the device including the safety bar latch as seen in Figure 1, Figure 5 is a partly broken out plan view of the portion of the device shown in Figure 4, Figure 6 is a view of a portion of the handcuff bars, and Figure 7 is a transverse sectional view taken on line 7—7 of Figure 6.

In the work of the police, it frequently happens that a single police officer apprehends a criminal and must transport him to the police station in a police automobile. During such transportation, the police officer, being busy with driving, is particularly vulnerable to a surprise attack by the criminal, who may injure the policeman and break away, even though handcuffed. The present device makes it possible for a single police officer to transport several criminals in the back seat of an automobile without fear of their escape.

Reference is now had to the drawings, in which like reference characters denote similar parts throughout the several views. As shown, there is an automobile with front and rear seats 2 and 4, with a floor space 6 between the front and rear seats. Left and upright support members 8 and 10, conveniently made of angle iron, form the support for the entire device, and are anchored at their lower ends 12 and 14 to the automobile chassis by welding or otherwise. The support members 8 and 10 are inclined rearwardly as shown in Figure 1, to conform to the contour of the rear surface 16 of the front seat 2, being placed in contact therewith.

A cross bar 18 is connected at its ends 20 and 22 to the upper ends 24 and 26 of the support members 8 and 10, as best seen in Figure 2, by welding or riveting, thus connecting and spacing the support members. Left and right safety bar brackets 28 and 30 are pivoted at their upper ends 32 and 34 to the upright supports 8 and 10 as shown in Figure 2, by means of pivot pins 36 and 38. A safety bar 40 is welded or otherwise secured at its ends 42 and 44 to the lower ends 46 and 48 of the safety bar brackets 28 and 30, the bar 40 being adapted for preventing the prisoners from moving their legs.

A fixed handcuff bar 50 is welded or otherwise secured at its left and right ends as seen in Figure 2, to the brackets 28 and 30 intermediate their ends, the bar 50 being formed with depressed curved portions 52 at intervals along its length which are the lower portions of handcuffs formed thereby. A movable upper handcuff bar 54 is pivoted at its left end 56 to the left end of the lower fixed handcuff bar 50 by means of a hinge 58 secured to both members as shown in Figure 3, so the entire bar 54 may pivot to the position shown in dotted lines in Figure 3 to open the handcuffs formed between the depressed handcuff portions 52 in the fixed bar 50 and the similarly but oppositely curved handcuff portions 60 formed in the upper movable handcuff bar 54. The curved portions 52 and 60 are lined with leather 62, and form wrist holes for the reception therebetween of the wrists of prisoners, the movable bar 54 being then pivoted clockwise from the broken line position as seen in Figure 2 to closed position, thus preventing the prisoners from withdrawing their wrists and escaping. A latch pin 64 has its shank extending through aligned holes 66 and 68 in the right ends of bars 50 and 54, and has a safety pin 70 insertable through a hole in the pin 64 and also through aligned transverse holes in the bar 54 to retain the pin 64 against removal and to keep the bar 54 in closed position shown on the right side of Figure 3. A spring 72 acts to spread the bars 50 and 54 apart when the safety pin 70 is removed.

A latch wheel 74, is pivotally secured to the lower end 48 of the bracket 30 by means of a pin 76, and is provided with notches 78 for reception of and engagement with a safety bar latch post 80 the other end 82 of which is welded to the side wall 84 of the automobile. The latch wheel 74 is held against rotation by means of a tongue 86 on one end of a safety bar latch 88 which is slidable longitudinally of the bracket 30 on pins 90 carried by bracket 30 and extending through an elongated slot 92 formed in the latch 88, as best seen in Figures 4 and 5. A handle 94 projects out of latch 88 for convenience in moving the latch into position. When the latch is all the way to the left with its tongue 86 engaging in one of the notches 78, as shown in Figure 4, a latch lock 96 carried on bracket 30, is pivoted on pin 98 to its horizontal locked position as shown in full lines in Figure 4, to lock the latch 88 against rightward movement, being supported on stop pin 100.

It is thus seen that our device will prevent the escape of prisoners and will hold them securely during transportation.

Although we have described a preferred embodiment of our invention in specific terms, it is to be understood that various changes may be made in size, shape, materials and arrangement without departing from the spirit and scope of the invention as claimed.

We claim:

1. A device for securing prisoners, comprising a frame securable to the chassis of an automobile and supportable inside the automobile, left and right side safety bar brackets pivoted at one end to said frame, a fixed handcuff bar secured at its ends to said left and right safety bar brackets intermediate their ends, and having a plurality of spaced wrist receiving depressions formed therein, a movable handcuff bar pivoted at one end to one end of said fixed handcuff bar and having a plurality of upwardly curved portions corresponding to said depressions in the fixed handcuff bar, for confining the wrists of the prisoners therebetween, said fixed and movable handcuff bars having aligned apertures at their ends remote from their pivotal engagement, a latch pin insertable through said apertures for locking said handcuff bars together, and a safety pin for holding said latch pin in place.

2. A device for securing prisoners, comprising a frame securable to the chassis of an automobile and supportable inside thereof, left and right safety bar brackets pivoted at one end to said frame, a fixed handcuff bar secured at its ends to said left and right safety bar brackets intermediate their ends, and having a plurality of spaced wrist receiving depressions formed therein, a movable handcuff bar pivoted at one end to one end of said fixed handcuff bar and having a plurality of upwardly curved portions corresponding to said depressions in the fixed handcuff bar, for confining the wrists of prisoners therebetween, locking means at the ends of said handcuff bars remote from their pivotal connection for locking said handcuff bars in closed position, a safety bar secured at its ends to the distal ends of said safety bar brackets, and releasable means engageable with the car frame for locking said brackets in prisoner holding position.

3. A device for securing prisoners, comprising a frame, means rigidly mounting said frame across the chassis of an automobile forwardly of a seat thereof, a fixed handcuff bar, means pivotally mounting said bar on said frame, said bar being formed with a plurality of depressions therein each adapted for the reception of the wrist of a prisoner, a movable handcuff bar, means pivotally mounting said movable bar on said fixed bar, said movable bar being formed with a plurality of upwardly-curved recesses corresponding to said depressions and adapted to cooperate therewith to confine wrists of prisoners therebetween, and releasable locking means for locking said fixed and movable bars together in a wrist-confining position.

4. A device for securing prisoners, comprising a frame, means rigidly mounting said frame across the chassis of an automobile forwardly of a seat thereof, a fixed handcuff bar, means pivotally mounting said bar on said frame, said bar being formed with a plurality of depressions therein each adapted for the reception of a wrist of a prisoner, a movable handcuff bar, means pivotally mounting said movable bar on said fixed bar, said movable bar being formed with a plurality of upwardly-curved recesses corresponding to said depressions and adapted to cooperate therewith to confine wrists of prisoners therebetween, releasable locking means for locking said fixed and movable bars together in a wrist-confining position, said second-named means including a rigid leg-confining bar rigidly connected thereto in spaced relation to said fixed handcuff bar, said last-named bar being movable with said first-named means into and out of a leg-confining operative position, and means for locking said first-named means in said operative position.

5. A device for securing prisoners, comprising a frame, means rigidly mounting said frame across the chassis of an automobile forwardly of a seat thereof, a fixed handcuff bar, extending transversely across said chassis, left and right safety bar brackets rigidly connected to said bar, means pivotally mounting said brackets to said frame, said bar extending between said brackets intermediate the ends of the latter, a movable handcuff bar, means pivotally mounting said movable bar on said fixed bar, said fixed and movable bars being formed with opposed cooperating recesses and depressions adapted to confine wrists of prisoners therebetween, releasable locking means for locking said fixed and movable bars in wrist-confining position, a leg-confining bar fixed to opposite end portions of said brackets and extending transversely of said chassis, said last-named bar being pivotal with said brackets into and out of an operative leg-confining position, and means for locking said brackets in said operative position.

6. A device for securing prisoners, comprising a frame, means mounting said frame rigidly to an automobile inwardly of the chassis thereof and forwardly of a seat thereof, a leg-holding bar extending transversely of said chassis forwardly of said seat, means pivotally mounting said bar on said frame for movement into and out of an operative leg-confining position, a fixed handcuff bar extending transversely of said chassis, means mounting said fixed handcuff bar on said second-named means in spaced relation to said leg-holding bar, movable means for detachably connecting a prisoner to said fixed handcuff bar, means for locking said last-named means in a prisoner-confining position, and means for locking said first-named means in an operative position.

CHARLES F. MESSINA.
MICHAEL M. MESSINA.

REFERENCES CITED

The following references are of record in the file of this patent:

UNITED STATES PATENTS

| Number | Name | Date |
| --- | --- | --- |
| 169,443 | Houston | Nov. 2, 1875 |
| 1,823,697 | Nenstiehl | Sept. 15, 1931 |
| 2,150,368 | Fitzgerald et al. | Mar. 14, 1939 |